United States Patent [19]

Washburn et al.

[11] Patent Number: 5,162,963
[45] Date of Patent: Nov. 10, 1992

[54] SURGE ELIMINATOR FOR SWITCHING CONVERTERS

[75] Inventors: Robert D. Washburn, Malibu; Jerry C. Sze, San Francisco; David M. Lusher, Torrance; Carlos H. Gonzalez, La Mirada; Robert F. McClanahan, Valencia, all of Calif.

[73] Assignee: Hughes Aircraft Company, Los Angeles, Calif.

[21] Appl. No.: 807,797

[22] Filed: Dec. 13, 1991

Related U.S. Application Data

[63] Continuation of Ser. No. 535,250, Jun. 8, 1990, abandoned, which is a continuation of Ser. No. 323,580, Mar. 14, 1989, abandoned.

[51] Int. Cl.$^5$ ............................................. H02H 9/04
[52] U.S. Cl. ..................................... 361/18; 361/111; 363/52; 363/126
[58] Field of Search ................... 361/18, 58, 111, 110, 361/113; 363/50, 51, 52, 53, 126

[56] References Cited

U.S. PATENT DOCUMENTS

| | | | |
|---|---|---|---|
| 3,911,324 | 10/1975 | Bishop | 361/18 |
| 4,031,452 | 6/1977 | Longa et al. | 363/52 X |
| 4,393,441 | 7/1983 | Enge | 363/126 |
| 4,802,055 | 1/1989 | Beckerman | 361/111 X |
| 4,841,429 | 6/1989 | McClanahan et al. | 363/126 |

Primary Examiner—Todd E. DeBoer
Attorney, Agent, or Firm—Leonard A. Alkov; Wanda Denson-Low

[57] ABSTRACT

A power supply including a source of AC power, a filter including inductive elements, and rectifying circuitry. Where the AC source comprises a sinewave source, the filter includes inductive and capacitive elements; and where the AC source comprises a square wave source, the filter includes only inductive elements.

12 Claims, 3 Drawing Sheets

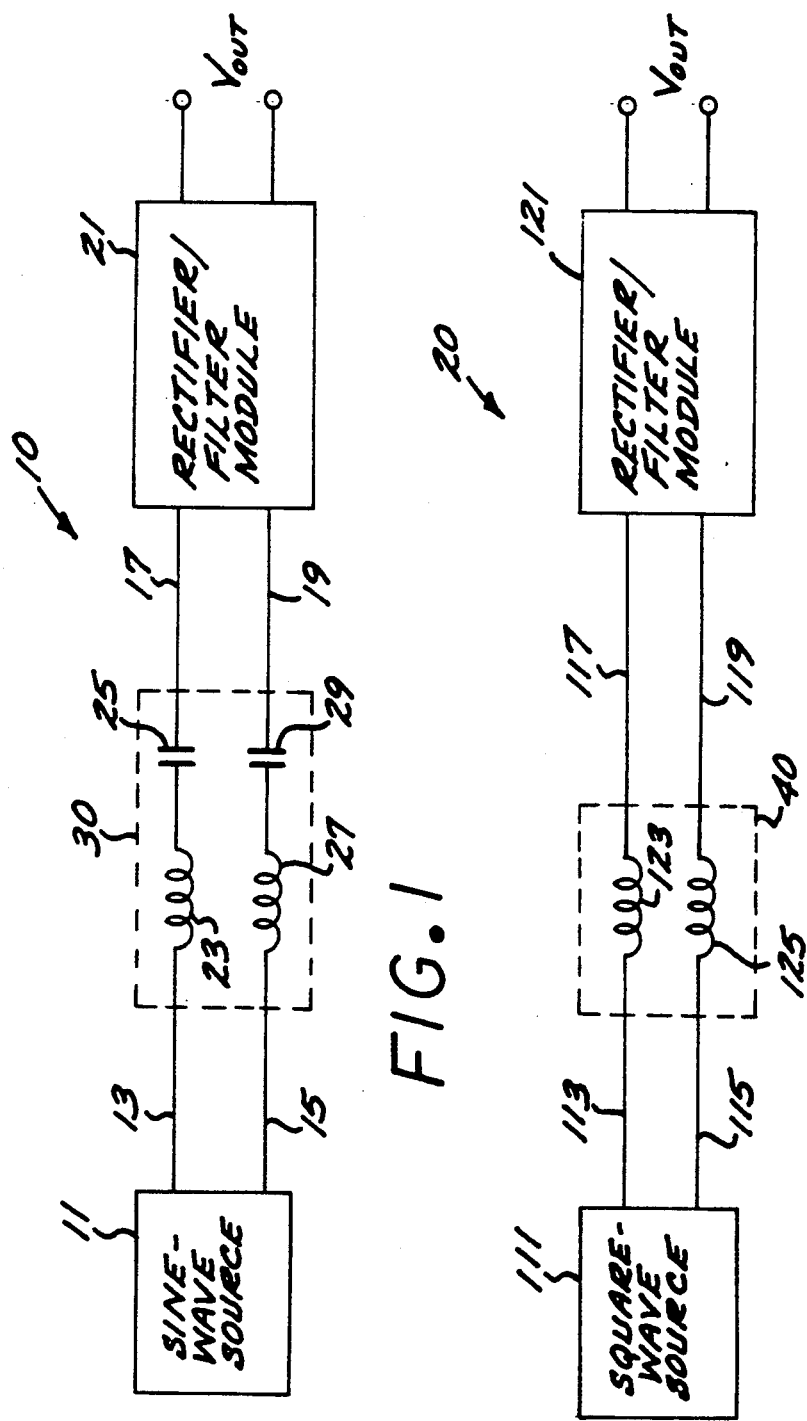

SURGE ELIMINATOR FOR SWITCHING CONVERTERS

This is a continuation of application Ser. No. 07/535,250 filed Jun. 8, 1990 which is a continuation of application Ser. No. 323,580 filed Mar. 14, 1989 both now abandoned.

BACKGROUND OF THE INVENTION

The disclosed invention is generally directed to rectifying power supplies, and is more particularly directed to a rectifying power supply which includes circuitry for reducing losses in the operation of the power rectifying diodes.

Rectifying power supplies are utilized in certain applications where the required supply voltage is DC. The originating power source may provide an AC voltage or a DC voltage. With a DC voltage supply, stepping the voltage up or down requires conversion of the DC power to AC power, which may be accomplished, for example, with a square wave converter or a sine wave converter. The AC power is then stepped up or stepped down as required, and then rectified and filtered.

The rectifying diodes used in rectifying power supplies continuously switch on and off in response to the AC power. As is well known, a diode does not instantaneously turn off, instead providing reverse current pursuant to reverse bias voltage to discharge stored charge. The resulting turn off or "recovery" reverse currents result in equivalent $I^2R$ power dissipation in the diodes, and current surges or spikes at the inputs to the rectifiers. The current surges or spikes reflect back to the AC power source as a heavier load, which causes higher current stresses on the semiconductor switching devices of the AC power source.

It has been determined that power dissipation and the magnitudes of the current surges or spikes due to diode recovery increase with increased forward current, and also increase with increased AC operating frequency. With increased AC operating frequencies, the voltage slew rate increases and reverse bias voltages increase more rapidly, which results in greater peak reverse currents.

Diode recovery time power dissipation and current surges or spikes are important considerations in high frequency power supplies. While significant improvements in the size and weight of rectifying power supplies have been made by increasing the operating frequency of the AC power, the recovery characteristics of known rectifier diodes results in reduced efficiency and increased component stress at higher frequencies. At some point, the rectifying diodes simply fail.

SUMMARY OF THE INVENTION

It would therefore be an advantage to provide a rectifying power supply having improved efficiency at higher operating frequencies.

It would also be an advantage to provide a rectifying power supply which substantially reduces current surges or spikes caused by diode recovery reverse currents.

Another advantage would be to provide a rectifying power supply which has an AC operating frequency of greater than 1 MHz and provides for efficient operation.

The foregoing and other features are provided in a power supply which includes circuitry for providing AC power, inductive filter circuitry responsive to the AC power, and rectifying circuitry, whereby the inductive filter circuitry reduces the current surges or spikes caused by diode turn off recovery.

BRIEF DESCRIPTION OF THE DRAWING

The advantages and features of the disclosed invention will readily be appreciated by persons skilled in the art from the following detailed description when read in conjunction with the drawing wherein:

FIG. 1 is a schematic of a rectifying power supply in accordance with the invention wherein the AC power is generally sinusoidal.

FIG. 2 is a schematic of a rectifying power supply in accordance with the invention wherein the AC power is a square wave.

DETAILED DESCRIPTION

Figure 3:
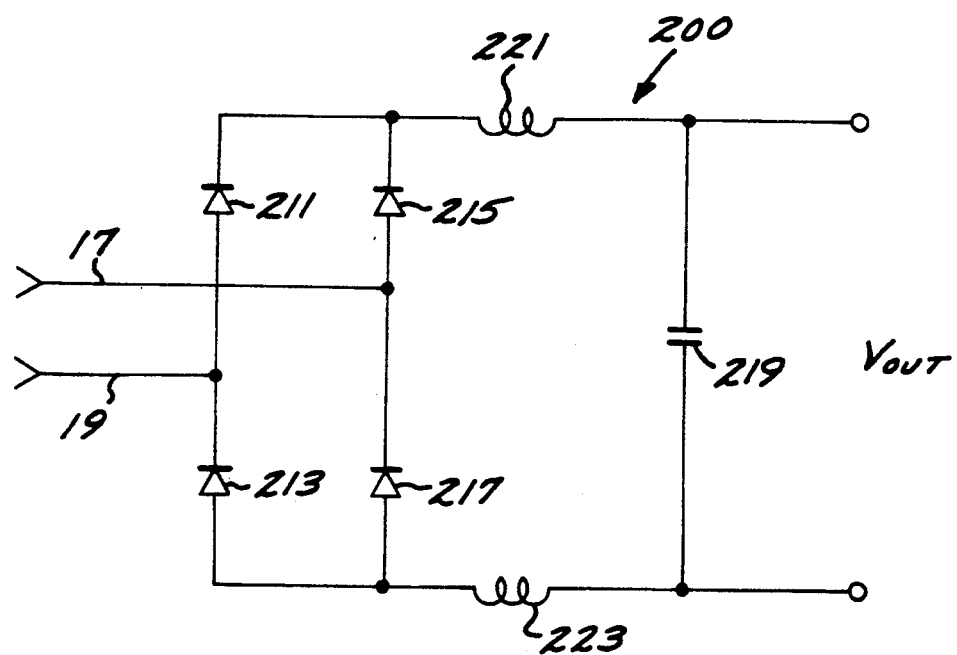
FIG. 3 is a schematic diagram of rectifier/filter module which can be used with the power supplies of FIGS. 1 and 2.

In the following detailed description and in the several figures of the drawing, like elements are identified with like reference numerals.

Referring now to FIG. 1, illustrated therein is a rectifying power supply 10 which includes a sinewave source 11 which, by way of example, can comprise known circuitry for converting a DC voltage to an AC voltage that varies sinusoidally. The output of the sinewave source 11 is coupled via output lines 13, 15 to a balanced filter circuit 30, which provides its output via lines 17, 19 to a rectifier/filter module 21. The rectifier/filter module 21 can be of conventional design for providing full wave rectification and filtering to produce a DC output voltage $V_{out}$.

The filter circuit 30 includes a first LC bandpass filter comprising an inductor 23 and a capacitor 25 which are serially coupled between the output line 13 and the line 17. The resonant circuit 30 further includes a second LC bandpass filter comprising an inductor 27 and a capacitor 29 which are serially coupled between the output line 15 and the line 19. For balance between the two AC outputs provided by the sinewave source 11, the inductors 23, 27 have the same value, while the capacitors 25, 29 have the same value. Further, the inductors 23, 27 can also have a common core.

The loaded Q of each of the LC bandpass filters in the filter circuit 30 is typically in the range of about 0.7 to 5. A procedure for selecting the component values of the LC bandpass filters, and an example of operating parameters and component values are set forth further herein.

Although the filter circuit 30 is shown as a balanced filter circuit, it is also possible to use an unbalanced filter circuit, for example, wherein one of the AC outputs is coupled to a bandpass filter while the other is not. However, the use of an unbalanced filter may be unsatisfactory in situations where effects of parasitic components are significant, for example, at higher frequencies. Specifically, at high frequencies, the level of high frequency noise resulting from an imbalanced filter network may be unacceptable.

Referring now to FIG. 2, illustrated therein is a rectifying power supply 20 which includes a square wave source 111, which, by way of example, can comprise known circuitry for converting a DC voltage to an AC voltage that varies as a square wave. The output of the square wave source 111 is coupled via output lines 113, 115 to a balanced filter circuit 40, which provides its output via lines 117, 119 to a rectifier/filter module 21. The rectifier/filter module 121 can be of conventional design for providing full wave rectification and filtering to produce a DC output voltage $V_{out}$.

The filter circuit 40 includes an inductor 123 coupled between the output line 113 and the line 117. Another inductor 125 is coupled between the output line 115 and the line 119. For balance, the inductors 123, 125 have the same value, and can share a common core.

Unlike the power supply 10 of FIG. 1, the filter 40 of the power supply 20 does not include capacitors since the AC voltage provided by the square wave source 111 includes flat or DC components.

Although the filter circuit 40 is shown as a balanced filter circuit, it is also possible to use an unbalanced filter circuit, for example, wherein one of the AC outputs is coupled to an inductor while the other is not. As with the power supply 10 of FIG. 1, an unbalanced filter may be unsatisfactory in situations where effects of parasitic components are significant, for example, at higher frequencies where the resulting high frequency noise may be unacceptable.

Referring now to FIG. 3, illustrated therein is a schematic of a rectifier/filter module 200 which may be utilized as the rectifier/filter modules 21, 121 in the power supplies 10, 20 of FIGS. 1 and 2. Specifically, the rectifier/filter module 200 includes a first pair of serially connected rectifier diodes 211, 213 in parallel with a second pair of serially connected rectifier diodes 215, 217. A pair of balanced inductors 221, 223 are connected in series with the diode pairs, and function to ensure continuous operation of the diodes 211, 213, 215, 217. A smoothing capacitor 219 is connected in series with the balanced inductors 221, 223. The output $V_{out}$ of the rectifier/filter module 200 is across the smoothing capacitor 219.

In the foregoing filter circuits 30, 40, it is believed that inductors function to reduce the current spikes or surges due to reverse conduction of the reverse biased diodes of the rectifier/filter modules, which reduces the $I^2R$ losses in such diodes and reduces the current loads imposed on the AC source by diode recovery. Specifically, without the filter circuits 30, 40, the peak reverse current of a reverse biased diode, which appears as a spike superimposed on the current due to the associated forward biased diode, can be excessively high. The peak reverse current when multiplied by the reverse resistance of a reverse conducting diode causes high dissipation at high frequencies. As the operating frequency is increased, the period over which peak reverse current occurs represents a larger portion of the operating cycle, which leads to higher power dissipation in the rectifier diodes.

Figure 4A:
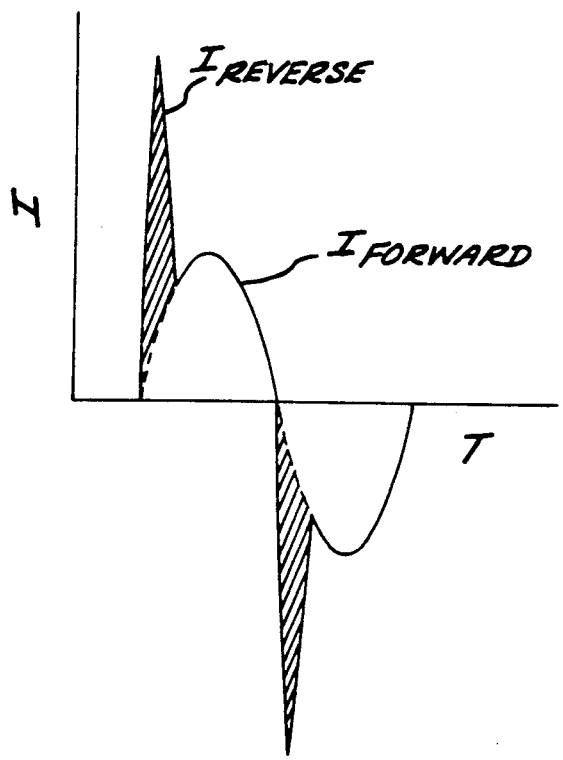
FIGS. 4A and 4B illustrate current waveforms that are helpful in understanding the power supply of FIG. 1.

FIG. 4A schematically illustrates, for the power supply 10 of FIG. 1, one cycle of what the current would be on one of the lines 17, 19 without the surge eliminating filter 30. The current includes both the forward current due to a forward biased rectifier diode and the reverse current due to the associated reverse biased rectifier diode, such reverse current appearing as a spike superimposed on the forward current. It should be appreciated that the actual relative levels of the forward and reverse currents will differ for different rectifier diode specifications. The current waveform on the other of the lines 17, 19 would be substantially identical but 180 degrees out of phase.

Figure 4B:
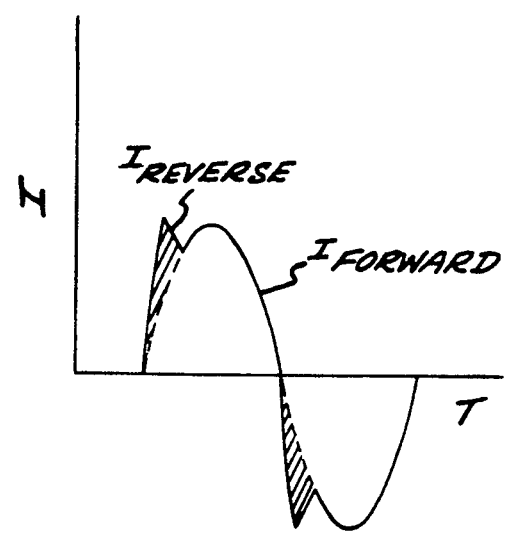

FIG. 4B schematically illustrates, for the power supply 10 of FIG. 1, one cycle of the current on one of the lines 17, 19 with the surge eliminating filter 30, and also includes both the forward current due to the forward biased diode and the reverse current due to the associated reverse biased diode. The current waveform on the other of the lines 17, 19 would be substantially identical but 180 degrees out of phase.

Figure 5:
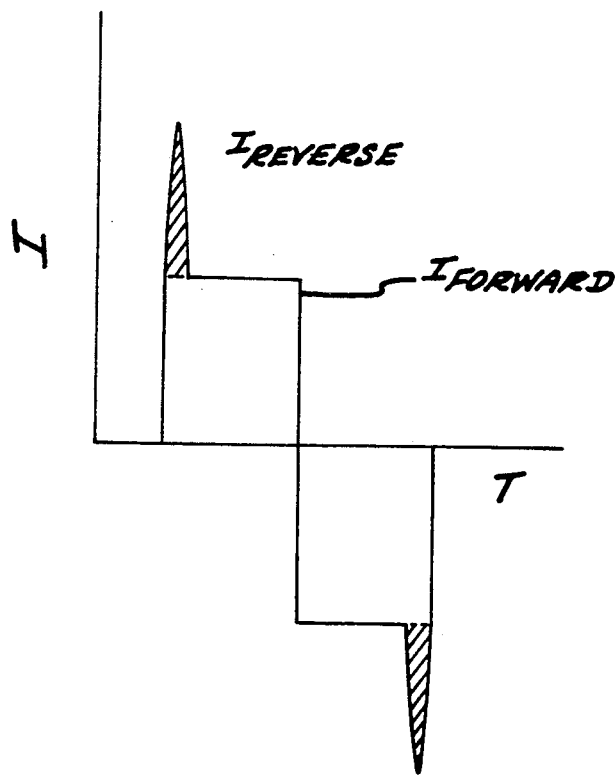
FIG. 5 illustrates a current waveform that is helpful in understanding the power supply of FIG. 2.

FIG. 5 illustrates, for the power supply 20 of FIG. 2, one cycle of what the current would be on one of the lines 117, 119 without the surge eliminating filter 40. The current includes both the forward current due to a forward biased rectifier diode and the reverse current due to the associated reverse biased rectifier diode, such reverse current appearing as a spike superimposed on the forward current. It should be appreciated that the actual relative levels of the forward and reverse currents will differ for different rectifier diode specifications. The current waveform on the other of the lines 117, 119 would be substantially identical but 180 degrees out of phase.

As a result of reducing the current peaks due to reverse diode conduction, increased operating efficiency is achieved, and higher AC operating frequencies can be utilized since the $I^2R$ dissipation in the rectifying diodes is reduced. While reduction of the recovery current peaks results in longer diode recovery time, which in turn imposes an upper limit on the AC operating frequency, such upper limit is greater than the upper limit without the filter circuits. In order to increase operating frequency, diode recovery time can be reduced by decreasing the forward diode currents since the stored charge is a function of forward current.

The component values of the surge eliminator filter circuits 30, 40 are generally chosen to limit the current spikes, for example measured on the input lines to the rectifier/filter modules 21, 121, to levels below that which would lead to thermal runaway of the rectifier diodes under anticipated current load conditions.

By way of specific example, an iterative test procedure can be utilized to select the desired inductive and capacitive components for the filter circuit 30 of FIG. 1. An inductor is chosen such that the interwinding capacitance of the physical device together with the inductor value does not cause a resonance at a frequency within an order of magnitude of the AC operating frequency. The capacitor value is selected to provide a resonant frequency of the L-C circuit that is equal to the AC operating frequency. The power supply is then tested to observe current at the lines 17, 19. If the current spikes (which include reverse biased diode current) are greater than the current peaks due only to forward biased diode current, the inductor value is increased, the capacitor value is changed accordingly to maintain the desired resonant frequency, and the power supply is again tested. This procedure is repeated as necessary to obtain current spikes which are close to the current peaks due only to forward biased diodes, as illustrated in FIG. 4B.

As to the inductors of FIG. 2, they are similarly selected by an iterative procedure to reduce the current spikes on the lines 117, 119 to levels that avoid thermal runaway of the rectifier diodes. For example, a relatively large inductor might initially be used, and then progressively smaller inductors would be used until the appropriate current spike or surge level is achieved.

The following are examples of operating parameters and component values for the power supply 10 of FIG. 1 utilizing the rectifier/filter module 200 of FIG. 3, where $F_s$ is the frequency of the output of the sinewave source 11:

| | |
|---|---|
| $F_s$: | 1.1 MHz |
| Inductors 23, 27: | 55 microhenrys |
| Capacitors 25, 29: | 410 picofarads |
| Diodes 211, 213, 215, 217: | Solid State Devices Inc. SPD524 |

The LC filter in the foregoing example has a loaded Q of less than 10.

The foregoing has been a disclosure of a power supply which provides advantages including increased operating efficiency and increased AC operating frequencies. By way of example, operating frequencies of about 1 MHz are readily utilized, and still higher frequencies can be utilized by reducing the peak forward currents in the rectifying diodes. Still further advantages include reduced loading of the AC source and reduced transients.

Although the foregoing has been a description and illustration of specific embodiments of the invention, various modifications and changes thereto can be made by persons skilled in the art without departing from the scope and spirit of the invention as defined by the following claims.

What is claimed is:

1. A power supply comprising:
   a source of AC power;
   rectifying diodes for providing a DC output voltage in response to an AC signal;
   inductive capacitance filter means responsive to said AC power for providing a filtered AC signal to said rectifying diodes and configured to limit the current spikes caused by the turn off recovery of said rectifying diodes to a maximum that is close to the current peaks due to the forward bias of said diodes;
   wherein said inductive capacitance filter means is series resonant at the fundamental operating frequency of the power supply, inductance is predetermined to limit peak diode recovery to increase efficiency of said rectifying diodes, and capacitance is pre-determined to be series resonant with the inductance at fundamental operating frequency of the power supply, with a resonant frequency substantially equal to the operating frequency of said AC source; and
   whereby said rectifying diodes operate at increased AC operating frequencies that would otherwise cause diode failure without said inductive filter means to minimize diode dissipation.

2. The power supply of claim 1 wherein said source of AC power includes two output lines, and wherein said inductive filter means comprises a balanced filter.

3. The power supply of claim 2 wherein said balanced filter includes first and second inductors respectively coupled between said output lines and said rectifying diodes.

4. The power supply of claim 3 wherein said first and second inductors are wound on a common core.

5. The power supply of claim 3 wherein said source of AC power comprises a sinewave source, and wherein said balanced filter further includes first and second capacitors respectively coupled in series with said first and second inductors.

6. The power supply of claim 5 wherein said first and second inductors have the same value, and wherein said first and second capacitors have the same value.

7. The power supply of claim 5 wherein respectively (a) said first inductor and said first capacitor, and (b) said second inductor and said second capacitor have a resonant frequency substantially equal to the operating frequency of said AC source.

8. The power supply of claim 3 wherein said AC source includes a square wave source.

9. The power supply of claim 1 wherein said inductive filter means includes an inductor serially coupled between said AC source and said rectifying diodes.

10. The power supply of claim 9 wherein said AC source comprises a sinewave source and further including a capacitor in series with said inductor.

11. The power supply of claim 10 wherein said inductor and capacitor have a resonant frequency substantially equal to the operating frequency of said AC source.

12. A power supply comprising:
    a source of AC power;
    rectifying diodes for providing a DC output voltage in response to an AC signal;
    inductive capacitance filter means responsive to said AC power for providing a filtered AC signal to said rectifying diodes and configured to limit the current surges or spikes caused by the turn off recovery of said rectifying diodes to a maximum that is close to the current peaks due to the forward bias of said diodes;
    wherein said inductive capacitance filter means is series resonant at fundamental operating frequency of the power supply, inductance is predetermined to limit peak diode recovery to increase efficiency of said rectifying diodes, and capacitance is predetermined to be series resonant with the inductance at the fundamental operating frequency of the power supply, with a resonant frequency substantially equal to the operating frequency of said AC source; and
    whereby said rectifying diodes operate at AC operating frequencies of about 1 MHz and higher, which would otherwise cause diode failure without said inductive means.

* * * * *

UNITED STATES PATENT AND TRADEMARK OFFICE
CERTIFICATE OF CORRECTION

PATENT NO. : 5,162,963

DATED : November 10, 1992

INVENTOR(S) : Richard D. Washburn et al.

It is certified that error appears in the above-identified patent and that said Letters Patent is hereby corrected as shown below:

Col. 7,
IN THE CLAIMS, the following should be added:

13. The power supply of Claim 12 wherein said source of AC power includes two output lines, and wherein said inductive filter means comprises a balanced filter.

14. The power supply of Claim 13 wherein said balanced filter includes first and second inductors respectively coupled between said output lines and said rectifying diodes.

15. The power supply of Claim 14 wherein said first and second inductors are wound on a common core.

16. The power supply of Claim 14 wherein said source of AC power comprises a sinewave source, and wherein said balanced filter further includes first and second capacitors respectively coupled in series with said first and second inductors.

17. The power supply of claim 16 wherein said first and second inductors have the same value, and wherein said first and second capacitors have the same value.

18. The power supply of Claim 16 wherein respectively (a) said first inductor and said first capacitor, and (b) said second inductor and said second capacitor have a resonant frequency substantially equal to the operating frequency of said AC source.

UNITED STATES PATENT AND TRADEMARK OFFICE
CERTIFICATE OF CORRECTION

PATENT NO. : 5,162,963

DATED : November 10, 1992

INVENTOR(S) : Richard D. Washburn et al.

It is certified that error appears in the above-identified patent and that said Letters Patent is hereby corrected as shown below:

19. The power supply of Claim 14 wherein said AC source includes a square wave source.

20. The power supply of Claim 12 wherein said inductive filter means includes an inductor serially coupled between said AC source and said rectifying diodes.

21. The power supply of Claim 20 wherein said AC source comprises a sinewave source and further including a capacitor in series with said inductor.

22. The power supply of Claim 21 wherein said inductor and capacitor have a resonant frequency substantially equal to the operating frequency of said AC source.

Signed and Sealed this

Fourteenth Day of February, 1995

*Attest:*

BRUCE LEHMAN

*Attesting Officer*  *Commissioner of Patents and Trademarks*